(No Model.)
H. ROSENTHAL & L. KRAMER.
HEATING BURNER.
No. 570,771. Patented Nov. 3, 1896.
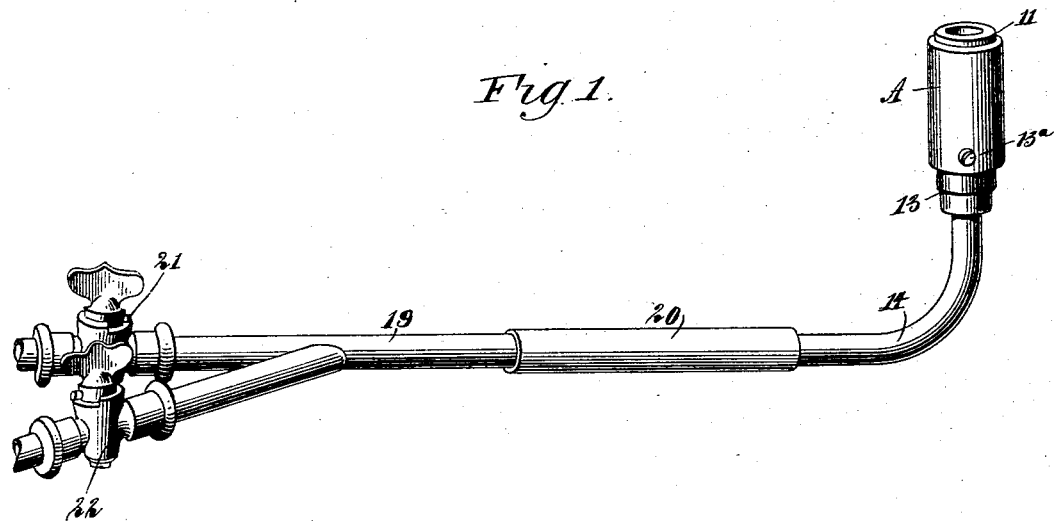
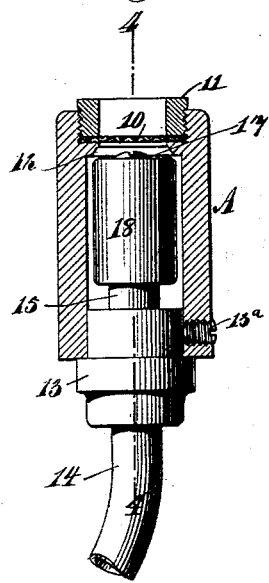
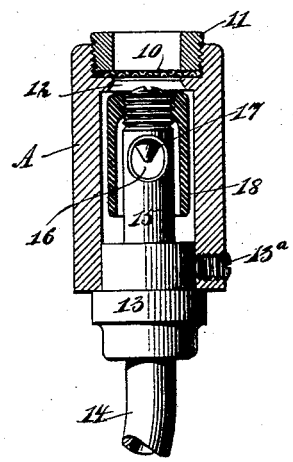
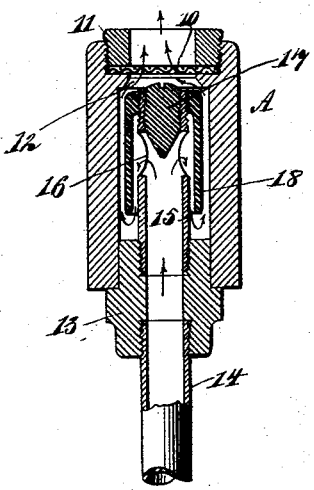
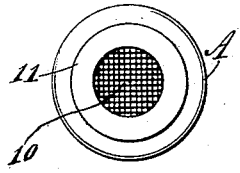
WITNESSES:
INVENTORS
H. Rosenthal
L. Kramer
BY
ATTORNEYS.

UNITED STATES PATENT OFFICE.

HERMAN ROSENTHAL, OF NEW YORK, AND LUDWIG KRAMER, OF BROOKLYN, NEW YORK; SAID KRAMER ASSIGNOR TO SAID ROSENTHAL.

HEATING-BURNER.

SPECIFICATION forming part of Letters Patent No. 570,771, dated November 3, 1896.

Application filed April 28, 1896. Serial No. 589,422. (No model.)

*To all whom it may concern:*

Be it known that we, HERMAN ROSENTHAL, of New York city, in the county of New York, and LUDWIG KRAMER, of Brooklyn, in the county of Kings, State of New York, have invented a new and useful Improvement in Heating-Burners, of which the following is a full, clear, and exact description.

Our invention relates to gas-burners especially adapted for heating purposes; and the object of the invention is to so construct a gas heating-burner that air and gas will be thoroughly commingled therein, and whereby a minimum amount of gas will be consumed and a maximum of heat will be obtained.

A further object of the invention is to construct the burner in a simple, durable, and economic manner, each and every part being interchangeably and removably connected with others, so that all portions of the burner may be expeditiously and effectually cleaned. The burner is adapted for use wherever heat is desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the burner connected with a source of gas and air supply. Fig. 2 is a vertical section through the burner, the inner chamber being shown in elevation. Fig. 3 is a vertical section through the burner, the inner and outer chambers being in section and the inner valve-controlled tube in elevation. Fig. 4 is a vertical section through the entire burner, the section being taken on the line 4 4 of Fig. 2; and Fig. 5 is a plan view of the burner.

The burner is provided with duplex mixing-chambers. The outer chamber is formed within a casing A, which is preferably of cylindrical shape, and one end of this chamber is practically open, and at the open end a diaphragm 10 is secured, which diaphragm is preferably made of a wire-netting, although any perforated or reticulated material may be used. Preferably the diaphragm is held in place by a sleeve 11, screwed into the open end of the cylinder or casing, and where the diaphragm is carried over the outer mixing-chamber the wall of the chamber is preferably reduced in diameter and given an outward and a downward inclination, forming an inclined outlet 12, as shown in Figs. 2, 3, and 4. The opposite end of the outer chamber is closed by locating a plug 13 in the casing or cylinder A, a set-screw 13$^a$ being usually employed to removably attach the said casing or cylinder to the said plug.

The plug 13 is adapted to receive an inlet-tube 14, which is entered at the outer end of the plug, and at the inner end of the plug a tube 15 is secured, receiving gas and air from the supply-pipe 14. This inner tube has openings 16 made therein, preferably diametrically opposite, and the upper end of the inner tube is closed by a valve 17, preferably of a plug type and having a tapering inner or lower end. This valve is screwed into the tube 15, so as to regulate the exit of the gas and air from the tube. The interior of the tube constitutes virtually the first or receiving chamber of the burner.

The innermost mixing-chamber 18 is preferably in the nature of a cylinder open at its lower end and is located around the inner or receiving tube 15, the upper or outer portion of the inner cylinder or casing being preferably screwed upon the valve end of the said receiving-tube, as shown in Figs. 3 and 4, and a space is provided around the entire inner casing or cylinder 18 and the inner or chambered portion of the outer casing or cylinder A. The interior of the inner cylinder or casing constitutes the inner mixing-chamber of the burner.

A bifurcated pipe 19 is connected with the inlet-pipe 14, the connection 20 being usually a flexible one, and the members of the bifurcated tube 19 are connected one with a source of gas supply and the other with a source of air supply, each branch or member being provided with a stop-cock, one of which is designated as 21 and the other as 22.

In the operation of the burner the air and gas are admitted into the inner pipe 15 of the burner and pass out together through the opening 16 into the inner mixing-chamber formed by the inner casing or cylinder 18. In this chamber the gas and air are mixed to a certain extent, but when the air and gas pass out from the inner chamber into the outer chamber formed by the outer cylinder or casing A a thorough commingling of the air and gas takes place, and the product is supplied to the diaphragm 10, at which point it is lighted, producing a flame which will burn with great intensity and which will require very little gas to properly feed it.

The burner is simple, durable, and economic, and it is evident that access may be gained to all of its parts and that any of the parts may be duplicated at pleasure.

Having thus described our invention, we claim as new and desire to secure by Letters Patent—

1. A gas-burner having a casing, one end of which serves for the discharge of the gas, an orificed plug fitting in the remaining end, a tube held by the plug and communicating with the orifice, the tube being located within the casing and extending upwardly to a point near the discharge end thereof, the tube also having an orifice near its upper end, a plug-valve fitting within the upper end of the tube and capable of regulating the discharge from the orifice thereof, and a cylinder located within the casing and embracing the tube, the upper end of the cylinder being secured to the upper end of the tube and the cylinder inclosing the orificed portion of the tube, substantially as described.

2. A gas-burner having a casing, an orificed plug fitting in one end of the casing, a tube communicating with the orifice of the plug and projecting into the casing, the tube having its inner end closed and having an orifice in its side adjacent to said closed end, and a cylinder within the casing, the cylinder having its upper end closed and connected to the closed end of the tube, the lower end of the cylinder being open to communication with the interior of the casing and the cylinder extending below the orifice in the tube, substantially as described.

3. A gas-burner having a casing, a tube held within the casing and communicating at one end with a gas supply, a plug fitting in and closing the opposite end of the tube, the tube having an orifice at its side and at a point adjacent to the plug and a cylinder within the casing, the cylinder having its upper end closed and connected to the upper end of the tube, the lower end of the cylinder being open and the cylinder receiving the gas from the orifice of the tube and conducting the gas downward to the interior of the casing, substantially as described.

HERMAN ROSENTHAL.
LUDWIG KRAMER.

Witnesses:
J. FRED. ACKER,
JNO. M. RITTER.